United States Patent
Singhal

(10) Patent No.: US 8,561,139 B2
(45) Date of Patent: Oct. 15, 2013

(54) METHOD AND APPARTUS FOR NETWORK SECURITY USING A ROUTER BASED AUTHENTICATION

(76) Inventor: Tara Chand Singhal, Torrance, CA (US)

( * ) Notice: Subject to any disclaimer, the term of this patent is extended or adjusted under 35 U.S.C. 154(b) by 370 days.

(21) Appl. No.: 12/378,943

(22) Filed: Feb. 20, 2009

(65) Prior Publication Data

US 2009/0199286 A1    Aug. 6, 2009

Related U.S. Application Data

(62) Division of application No. 10/956,542, filed on Oct. 1, 2004, now Pat. No. 7,519,986.

(60) Provisional application No. 60/507,871, filed on Oct. 1, 2003.

(51) Int. Cl.
*H04L 29/06*    (2006.01)

(52) U.S. Cl.
USPC ........ 726/2; 726/3; 726/4; 713/182; 713/183; 713/184

(58) Field of Classification Search
None
See application file for complete search history.

(56) References Cited

U.S. PATENT DOCUMENTS

| | | | | |
|---|---|---|---|---|
| 5,966,441 A * | 10/1999 | Calamera | ..................... | 713/167 |
| 6,334,056 B1 * | 12/2001 | Holmes et al. | ................. | 455/445 |
| 6,600,734 B1 * | 7/2003 | Gernert et al. | ................. | 370/352 |
| 6,601,762 B2 * | 8/2003 | Piotrowski | ..................... | 235/382 |
| 6,731,731 B1 * | 5/2004 | Ueshima | ....................... | 379/196 |
| 6,789,118 B1 * | 9/2004 | Rao | ............................... | 709/225 |
| 6,859,878 B1 * | 2/2005 | Kerr et al. | ..................... | 713/183 |
| 6,968,050 B1 * | 11/2005 | Pershan et al. | ................. | 379/196 |
| 7,058,584 B2 * | 6/2006 | Kosinski et al. | .................. | 705/2 |
| 7,133,662 B2 * | 11/2006 | Bravo et al. | ..................... | 455/411 |
| 7,565,547 B2 * | 7/2009 | Matta et al. | .................... | 713/182 |
| 7,746,876 B2 * | 6/2010 | Rune et al. | ..................... | 370/401 |
| 2002/0010865 A1 * | 1/2002 | Fulton et al. | .................. | 713/201 |
| 2002/0064147 A1 * | 5/2002 | Jonas et al. | ..................... | 370/351 |
| 2002/0143708 A1 * | 10/2002 | Hollander et al. | ............... | 705/72 |
| 2003/0002637 A1 * | 1/2003 | Miyauchi et al. | .......... | 379/93.01 |
| 2003/0135600 A1 * | 7/2003 | Isoyama | ....................... | 709/223 |
| 2004/0037223 A1 * | 2/2004 | Harrison et al. | .............. | 370/235 |
| 2004/0117804 A1 * | 6/2004 | Scahill et al. | .................. | 719/320 |
| 2004/0215451 A1 * | 10/2004 | Macleod | ........................ | 704/231 |
| 2005/0022007 A1 * | 1/2005 | Phillips et al. | ................. | 713/201 |
| 2008/0040773 A1 * | 2/2008 | AlBadarin et al. | ................ | 726/1 |

* cited by examiner

*Primary Examiner* — Benjamin Lanier
(74) *Attorney, Agent, or Firm* — Steve Roeden, Esq.

(57) ABSTRACT

A router based authentication system provides packet level authentication of incoming data packets and eliminates the risk of having data packets come in to the network whose source cannot be authenticated. In Router Based Authentication System (RBAS), a prior art router is adapted with an authentication function that works in conjunction with a security function in the client. Alternatively, a new router can be built that embeds an authentication function. The router based authentication function includes: (i) an ability to receive a telephone call and verify the caller by comparing with pre-stored caller id, (ii) generate a random alphanumeric code, deliver to the caller, and save in the system, (iii) reject all packets from the client that do not have a passkey embedded in the header of the packet. The security function in the client includes (i) display of an authentication screen that may display a telephone number to a border or internal router of a computer network of a business and enables entry of the passkey made up of the telephone number of the user and the alphanumeric code, and (ii) a function that encrypts the passkey and inserts the passkey in the header of each outgoing data packet to the business.

17 Claims, 6 Drawing Sheets

---

A user desiring data interface connection to business invokes a security software function in the client, which displays an authentication screen, displaying an 800 number and an entry field for a passkey.    500

The User calls the 800 number and enters PIN. Optionally, also enters a numeral that specifies in minutes the length of the session desired. The adapted border router receives call from user, verifies caller id in database, and generates a random alphanumeric passkey and delivers it user and saves these in the border router database anchored by caller id.    502

User enters in the authentication screen, passkey made up of caller id and just received random alphanumeric and clicks CONNECT button.    504

The CONNECT button click initiates a session to border router, having pre-stored the link URL, the security software function alters (encrypts) the passkey and embeds the passkey in each data packet header options data fields sent to the border router.    506

The adapted router rejects all packets without option data, decrypts and verifies the option data against the authentication database fields of caller id and alphanumeric, then routing function routes packet to business data network.    508

A user desiring data interface connection to business invokes a security software function in the client, which displays an authentication screen, displaying an 800 number and an entry field for a passkey.   500

The User calls the 800 number and enters PIN. Optionally, also enters a numeral that specifies in minutes the length of the session desired. The adapted border router receives call from user, verifies caller id in database, and generates a random alphanumeric passkey and delivers it user and saves these in the border router database anchored by caller id.   502

User enters in the authentication screen, passkey made up of caller id and just received random alphanumeric and clicks CONNECT button.   504

The CONNECT button click initiates a session to border router, having pre-stored the link URL, the security software function alters (encrypts) the passkey and embeds the passkey in each data packet header options data fields sent to the border router.   506

The adapted router rejects all packets without option data, decrypts and verifies the option data against the authentication database fields of caller id and alphanumeric, then routing function routes packet to business data network.   508

Figure 5

METHOD AND APPARTUS FOR NETWORK SECURITY USING A ROUTER BASED AUTHENTICATION

CROSS REFERENCE TO RELATED APPLICATIONS

This application is divisional of application Ser. No. 10/956,542, filed on Oct. 1, 2004 now U.S. Pat. No. 7,519,986.

This application claims priority on Provisional Application Ser. No. 60/507,871, entitled "Method and Apparatus for Network Security Using a Router Based Authentication System" filed on Oct. 1, 2003, by Tara Chand Singhal. The contents of the Provisional Application Ser. No. 60/507,871 are incorporated herein by reference.

This application also claims priority on U.S. patent application Ser. No. 10/217,287, entitled "Method And Apparatus For User Authentication Using A Cellular Telephone And A Transient Pass Code" filed on Aug. 12, 2002, by Tara Chand Singhal. The contents of the U.S. patent application Ser. No. 10/217,287 are incorporated herein by reference.

FIELD OF THE INVENTION

The present invention is directed to a method and apparatus for network access security using a router based authentication system for authenticating incoming data packets to a data network.

BACKGROUND

A business's computer network servers are protected by a border router, which hosts a firewall. The firewall checks and filters each incoming data packet, based an access control list programmed in the firewall. The access control list identifies the source and destination computer Internet Protocol (IP) addresses as well as destination computer port addresses. The firewall rejects al packets based on the source computer IP address, destination computer IP address and the destination computer port address that are listed in the access control list.

The header of the incoming data packets contains the source computer IP address, the destination computer IP address, and the destination computer port. IP denotes a unique address of every computer on a network and the port denotes the connection to a specific application of the computer.

The identification of source of a packet is in the form of an IP address, and is created and can be changed or altered to be set to any value by the source computer. Therefore, the destination computer cannot truly know where the packet came from or which computer it originated from. This is how spurious and harm causing data packets are sent to a computer over which the destination computer has no control since it cannot really authenticate the source of the data packet.

Therefore, a border router/firewall functions by checking each packet and filtering out those packets that are not for approved destination ports and did not come from a source IP and are not for a given destination IP as specified in the access control list. There are other types of firewall that may be placed before an application server that check for unauthorized or spurious content that is specific to that application in the packet.

In addition to the protection using border router/firewall to filter out data packets as described above, prior art teaches that the source authentication for each computer session between a source and a destination computer is performed using a user id and password. However, password is considered a weak form of authentication by the Information Security Experts as this form of authentication can be easily compromised.

Since there is no certainty that the sender of these data packets is who it says it is, the prior art may allow entry of data packets into a network that are harmful to a destination computer, The industry solution to this state of weakness in protecting a network from harm has been to build an Intrusion Detection System (IDS). The IDS is a software function that is deployed on a server inside the network and monitors or sniffs all data packets traveling in the network. The IDS, copies all data packets in the network and applies rule and signature based logic to detect threat scenarios and alert the system managers that an attack may be taking place.

In the IDS approach, the data packets that cause harm have already entered the network in spite of the border router/firewall and the user authentication with a password. The IDS is a complex approach and does not work all the time creating many false alarms. It is so complex, that many businesses have hired other businesses to send them all the data traffic to a remote facility and let them monitor the data packets, thus also creating an issue of confidentiality of data going to another business.

Many businesses use card/token based strong (two-factor) source authentication in current systems for network access security. In card/token-based systems of access security, each employee of a business is given a card and a card reader. At the time of log in, the employee uses the card and a personal number in conjunction with the card to as well as a password to authenticate to the business computer system. The card/token based access control system is costly, has operational security and logistical issues, and therefore, is not widely used by businesses. Therefore businesses are using only a one-factor (password) authentication for establishing security of a session.

In light of the above, it is an objective of the present invention to have an apparatus and methods for network access security that does not have the deficiencies of the prior art as described above.

SUMMARY

The present invention is directed to a method and apparatus for network access security using a router based authentication system that provides a two factor packet level authentication for all incoming data packets from a source computer before routing them to the destination computer.

The two factors refer to something you know and something you have, out of the three possible factors including something you are such as a biometrics. These three factors are used in information security industry for judging the strength or adequacy of authentication. Any two factors combined yield a strong authentication, whereas one factor only such as a password (something you know) is considered a week form of user authentication.

In this invention, referred to as Router Based Authentication System (RBAS), a prior art router is adapted with an authentication function that works in conjunction with a security function in the client. Alternatively, a new router can be built that embeds an authentication function as described in this invention. Such authentication routers can be placed strategically inside a business's computer network. For example, they can be placed as border routers and major routers between sections of the network connecting different business function of the business.

The security function in the client includes (i) display of an authentication screen that may display a telephone number to a border or internal router of a computer network of a business and enables entry of the passkey made up of the telephone number of the user and the alphanumeric code, and (ii) a function that encrypts the passkey and inserts the passkey in the header of each outgoing data packet to the business.

The router based authentication function includes: (i) an ability to receive a telephone call and verify the caller by comparing with pre-stored caller id, (ii) generate a random alphanumeric code, deliver to the caller, and save in the system, (iii) reject all packets from the client that do not have a passkey embedded in the header of the packet.

The network access security using router based authentication system of this invention serves the businesses by eliminating the risk of having data packets come in to the network whose source cannot be authenticated. Thus eliminate the risk of being a target for hackers.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts. The drawings are:

FIG. 5 is a flow diagram that illustrates the operation of the router based authentication system.

DESCRIPTION

Introduction

Network access security technologies of prior art, perform session authentication using a user id and a password. Sometimes to make the session authentication additionally or more strong, a security token or a security card is used in addition to the password.

A Router Based Authentication System (RBAS) of the current invention, for network access security performs packet level authentication of the source of each data packet coming into a business's computer network. In addition this packet level authentication in the current invention is accomplished without the prior art card based access control systems that add additional cost, operational security, and logistics issues of stocking, distributing and maintaining the security tokens or security card and card readers.

RBAS uses and takes advantage of the existing public telephone network infrastructure and thus avoids the infrastructure cost of maintaining card dependent security systems of the prior art. In RBAS, the source authentication of incoming data packets to a border router of a computer network is performed via a two-factor authentication that leverages the public voice telephone using caller id features and a personal identification number (PIN).

Therefore, there are three main distinguishing features of RBAS compared to prior art user authentication. These are: (i) RBAS does a packet level authentication for every packet coming into a network from an authorized user, whereas in prior art a session authentication only is performed in the beginning of a session; (ii) RBAS does authentication at the border router, and can appropriately route the authenticated and non-authenticated data packets, whereas in prior art the authentication is done at the application server level; (iii) RBAS does two-factor authentication without the added cost and complexity of security tokens and biometrics as in prior art means of strong two-factor authentication.

Figure 1A:
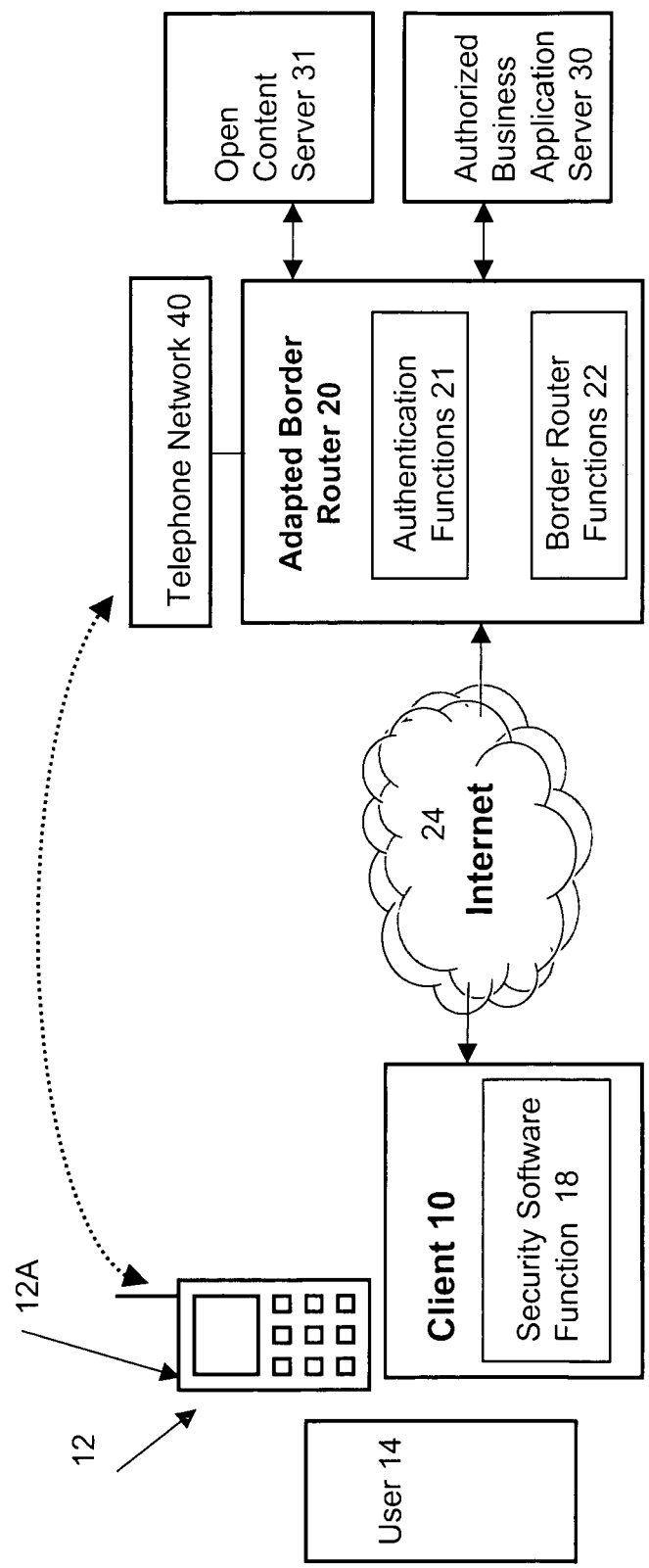
FIG. 1A is a block diagram that illustrates a version of the current invention of a router based authentication system.

With initial reference to FIG. 1A, the RBAS for network access security has, an authorized user 14 using a client 10 with a Client Security Software Function 18.

The user 14 has a cellular telephone 12 with a telephone number 12A. There is an adapted border router 20 adapted with an interface to a telephone network 40, and authentication function 21. The adapted router 20 also includes a prior art router function 22. The client 10 communicates with the business server 30 via the border router 20 using the Internet 24. The adapted router 20 is capable of routing the packets to business network that may include business application server 30 which only authorized users 14 can access and open content server 31, which all unauthorized users can access. These represent classes of network with different access security requirements.

Figure 2A:
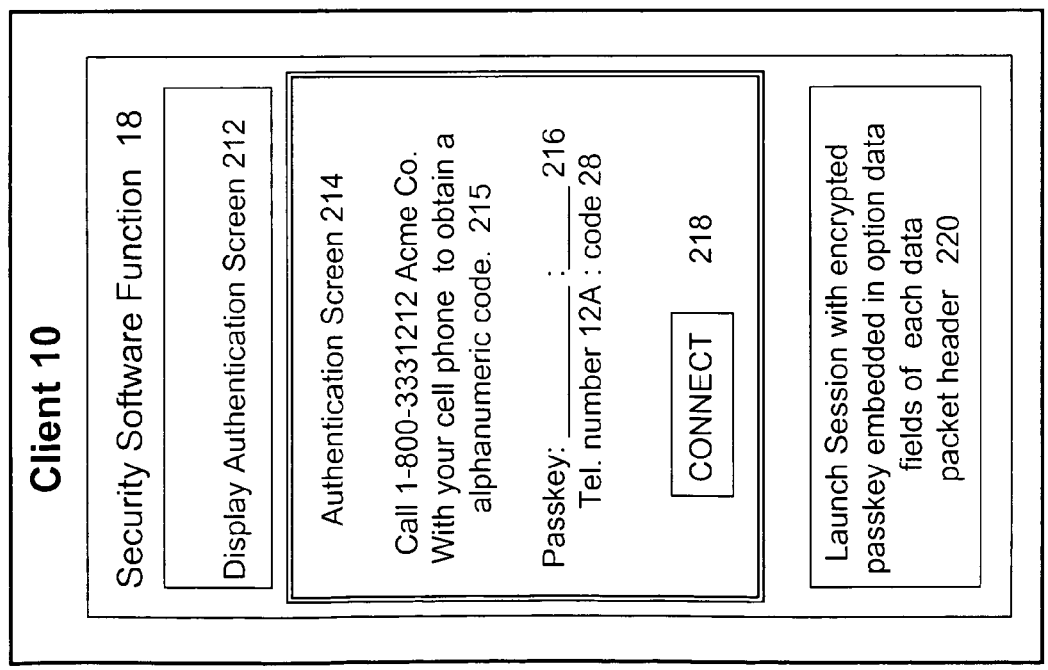
FIG. 2A is a block diagram that illustrates the client security functions of the current invention.

With initial reference to also FIG. 2A, the authorized user 14 using the telephone 12 dials a telephone number assigned to the adapted border router 20 and receives an alphanumeric code 28. The user 14 uses security function 18 that uses a passkey 216 composed of the alphanumeric code 28 and the cell telephone number 12A, and a function 220 that embeds an encrypted version of the passkey 216 in the header of each packet to authenticate the packets to the border router 20.

In summary, an RBAS implementation has:

(A) A router adapted with an authentication system. The system is equipped with (i) an interactive voice response system, that verifies the caller by caller id and PIN and generates and voice delivers a random alphanumeric code to the user, (ii) a database that maintains the cell telephone numbers and PIN of authorized users, and (iii) a function that verifies each packet via a passkey in the header of each packet.

(B) A security software function that is present in the client of an authorized user that (i) displays an authentication screen with a telephone number of the adapted router, (ii) accepts the entry of the cell number plus the random alphanumeric as entry of a passkey, and (iii) encrypts the passkey and embeds the passkey in the option field of each packet header.

An added optional security feature lets the user pre-select the length of the session in minutes or have a default value that would enable the authentication functions 21 in the router 20 to disable packet traffic from this user at the expiry of the session time.

Figure 1B:
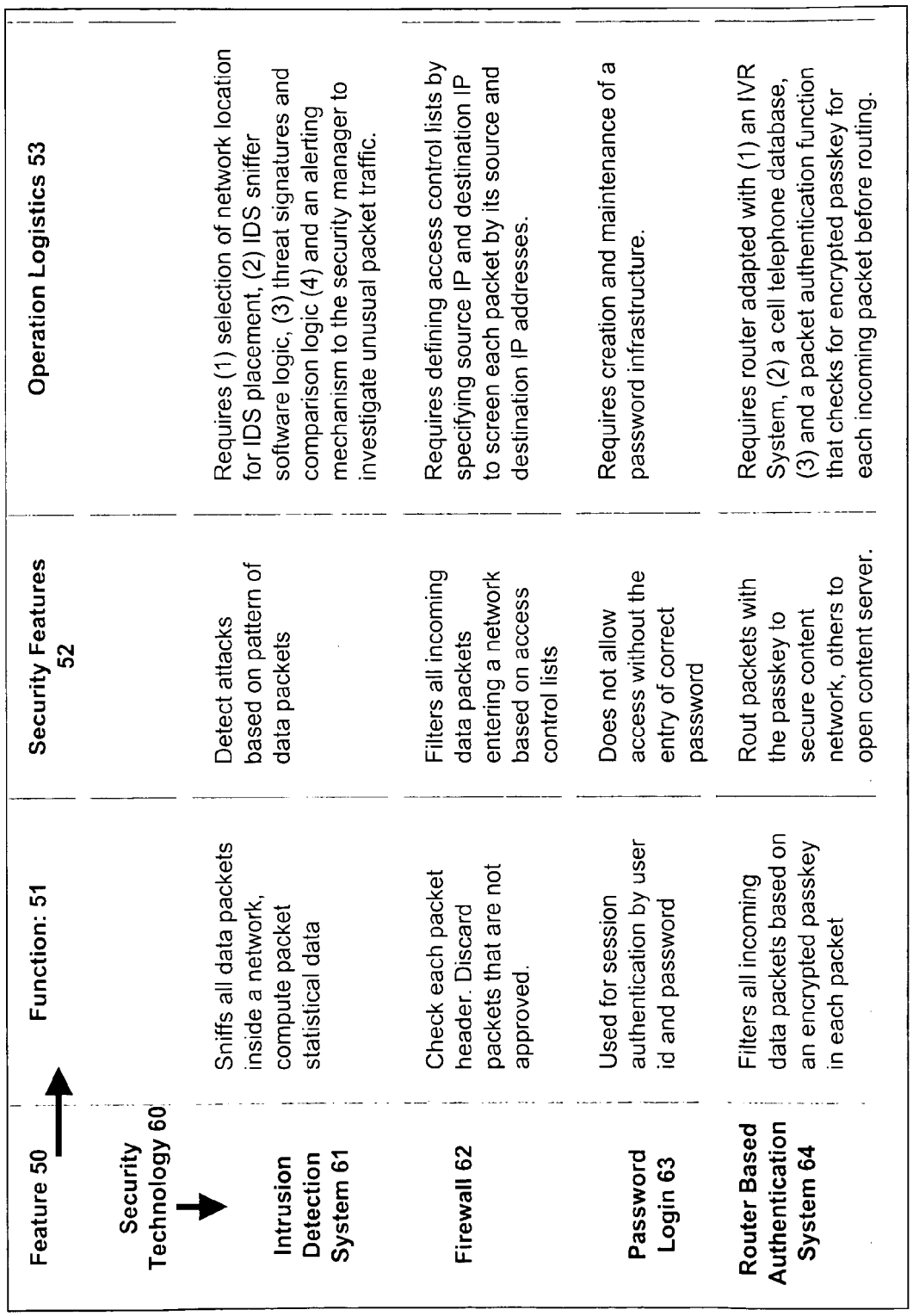
FIG. 1B is a comparison of other network access security technologies with the router based authentication system of the current invention.

RBAS enables a robust and cost effective network access security solution compared to the current prevalent network security technologies. FIG. 1B shows a comparison of the RBAS network access security compared to the current security technologies of Firewall, Intrusion Detection Systems and the login using a password.

RBAS can be implemented in both the border routers (FIG. 1A) and the major internal to the business network routers (not shown). FIG. 1B comparison illustrates the RBAS has the potential to replace firewalls, password infrastructure and the IDS systems and their costs and still provide a comparable or better network access security. The comparison includes the features 50 such as function 51, security 52 and operational logistics 53 for the different access control technologies 60 of IDS 61, Firewall 62, Login 63 and the current invention RBAS 64.

The preferred embodiment uses cellular phones being used to call the adapted router 20. A home phone, a business phone, or any other phone may also be used provided the telephone number is pre-stored in the router 20. The current caller ID technology provided by the telephone companies uniquely identifies a cell phone owner, or a telephone caller and is used to primarily verify the caller to the router system in addition to a PIN as described later as part of verification function 242 with reference to FIG. 3.

The RBAS security system of this invention serves the businesses by eliminating the risk of having data packets come in to the network whose source cannot be authenticated. Thus eliminate the risk of being a target for hackers.

As an additional security feature the passkey that is embedded in each packet may be encrypted or altered and the user can pre-select the length of the session in minutes. These features are described later with reference to FIGS. 2A, 2B, 3, and 4. These embodiments are described herein. The headings are provided for the convenience of the reader.

Authentication Router 280

Figure 3:
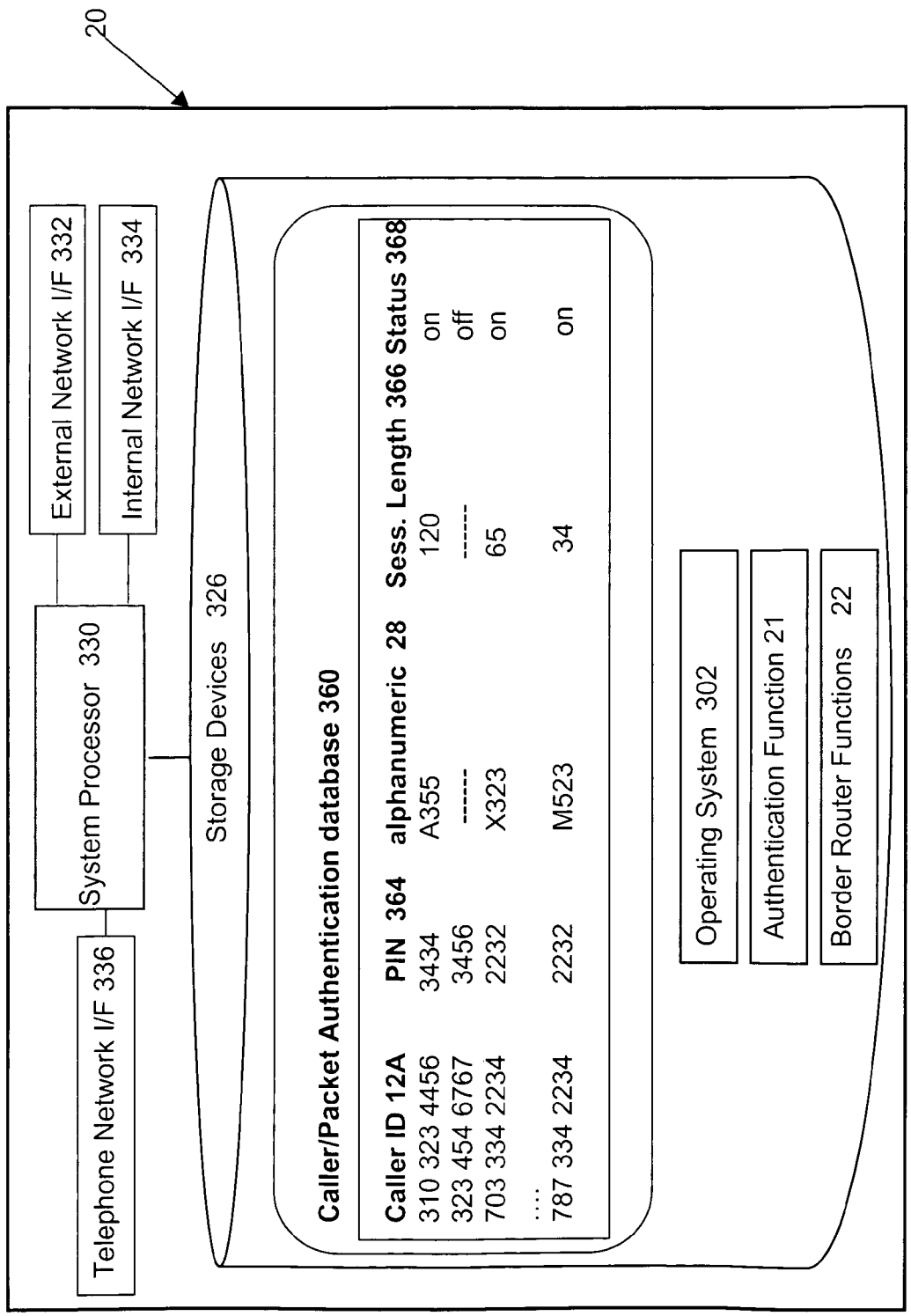
FIG. 3 is a block diagram that illustrates a version of the border router based authentications system of the current invention.

With reference to FIG. 3, an authentication router 280 includes router functions 22, authentication functions 21, input interface 332, capable of receiving incoming data packet traffic, output interface 334, capable of routing the data packets to other servers based on the destination IP and port addresses in the header of the data packet, a telephone interface 336 with a modem with the ability to receive a telephone call and dial out a telephone call, and a service interface 266.

The telephone interface 336 may be a T 1 line that can receive up to 24 analog voice calls, interfaces with a Dialogic, Brooktrout or some other similar brand line interface modem. The interface 336 may also be a Voice over IP(VoIP) interface via a VoIP gateway to receive telephone calls. These modems and VoIP Gateways are prior art technologies.

The service interface 266 is able to load data such as access control lists 252 for firewall function and storage memory 326 for authentication functions 21 into the authentication router 280. The service interface is also used to load programs such as authentication function 21 and router functions 22. The service interface may include another computer and is prior art.

The storage memory 326 of router 280 may be any high-speed conventional memory such as Flash or similar other memory that can retain data without power. Alternatively, it may also be disk-based storage memory. In general, the router 280 is a general-purpose digital computer that has been adapted to perform the functions of an authentication router as described here.

The router functions 22 include a prior art router function 208, that routs packets to interface 334 based on destination address, a prior art firewall function 250 that filters packets for routing based on access control lists 252. The access control lists provides rules regarding the routing of packets based on source and destination IP and port addresses. The router function 208 is also used to route packet traffic from the interface 334 to the interface 332.

The authentication functions 21 include an Interactive Voice Response (IVR) function 240 that can receive a call, get caller id, receive tone inputs, convert them into numbers, and output a voice response alphanumeric to the caller. The IVR technology is prior art and used by many businesses.

The verification function 242 includes means to verify the caller to the authentication router 280. There are three different means to identify the caller. One means is by caller id, another means is by entry of a personal identification number on the keypad of the telephone, and a third means is the IVR dialing out or calling back on a pre-stored caller id telephone number. These three different means can be combined in different ways to achieve what is called a two-factor identification or authentication of the caller. Some of them are described here:

Means A: Verify the caller (i) by comparing the incoming caller id with a pre-stored caller id in database 360 and (ii) by comparing an entry of a PIN to that pre-stored in database 360 for that caller ID. There may be more than one caller id pre-stored in the database 360, allowing the caller to call from a home phone, a cell phone, or a business phone.

Means B: Verify caller by a caller id, then disconnect and the caller hangs up. The IVR calls the caller back to the same caller id provided it is one of the caller ids pre-stored in the database 360.

Means C: Verify a caller, by caller id and entry of a PIN1 and then disconnect/hang up. The IVR then calls the caller back on a pre-stored caller id and receive entry of second PIN2, and then again verify by comparing with a pre-stored PIN2 in the database 360.

As described here PIN is a numerical personal identification number and is the preferred embodiment due to ease of entering a numerical number on the keypad of a telephone. It may also include other keys such as # and * etc.

The key function 244, generates a random alphanumeric key that is called Random Pass Key (RPK). The RPK may be numeric only or alphanumeric and may include any number of digits. The preferred embodiment includes a 4 to 6 digit alphanumeric. The RPK is voice delivered to the caller after the caller has been verified by any one of the means as described above as part of the verification function 242.

The packet authentication function 246, examines the header of each incoming data packet for the presence of optional data. If there is no optional data fields as explained later with reference to FIG. 4, then the packet is not from an authorized source and can be routed to an open content server 31, as illustrated in FIG. 1A. If the header of the packet contains the optional data fields as described in FIG. 4, then it may be assumed to be from an authorized user and the contents of the data fields in the form of signature composed of the caller id and the RPK needs to be verified with reference to database 360.

In the signature verification, the caller id is first decrypted, by whatever approach it was encrypted by the client security function 18. After the caller id is decrypted, then it is checked against the database 360 to find the corresponding RPK alphanumeric 28. Using the RPK in the database 360 as a key, the RPK in the packet is decrypted and the decrypted RPK is compared with RPK alphanumeric 28. If they match, then the data packet is routed to an authorized application server 30, to as illustrated in FIG. 1A.

Other features as part of the authentication functions 21 may also be optionally provided. One such feature is where the session length of a session of user to the network is limited in time. For example, a variable in database 360, called session length 366 may be used where it specifies the length of the session, let us say in minutes. When the caller calls the telephone number of the router, in addition to entering a PIN of fixed length, the user may also enter extra digits that may serve to define the session length variable 366 in the database 360. Pursuant to this feature, the session is automatically terminated after the session length. A default value may be provided for session length 366, such as 30 minutes. After the expiry of time of session length, the session would be automatically terminated, the router 280 refuse to route any more packets with this RPK and the RPK is deleted from the database 360. The authorized then has to initiate a fresh authentication procedure requiring calling and getting a new RPK.

Another feature as part of the authentication functions 21 may also be to define in the database 360, what are the authentication privileges (not shown) of the user. For example, the user may be authorized to connect to some of the application servers and not others based on his role or function within an organization. These selective accesses based on user authorization and defined user roles and functions within the business organization are access policies for different business networks.

Adapted Router 20

The router based authentication system may also use an existing router that has been adapted with an authentication function. Such an adaptation of a router is described here. Referring to FIG. 3, the adapted router 20 includes (i) a storage device 326, (ii) an operating system 302 stored in the storage device 326, (iii) authentication functions 21 and a conventional router functions 22 stored in the storage device 326, (iv) and a processor 330 connected to the storage device 326, The processor 330 can include one or more conventional CPU's. The processor 330 can be capable of high volume processing and database searches.

The authentication system storage device 326 can, for example, include one or more magnetic disk drives, magnetic tape drives, optical storage units, CD-ROM drives and/or flash memory. The storage device 326 also contains an authentication database 360.

The adapted router 20 includes a telephone network interface 336 that allows the adapted router 20 to communicate with the user 14 via the cell phone 12. The adapted router 20 also includes a system network interfaces 332 that allows the authentication system 10 to communicate with the Internet 24 or another computer network. The adapted router 20 also includes a system network interface 334 that allows the router 20 to communicate with business network 30 (as shown in FIG. 1A).

Figure 2B:
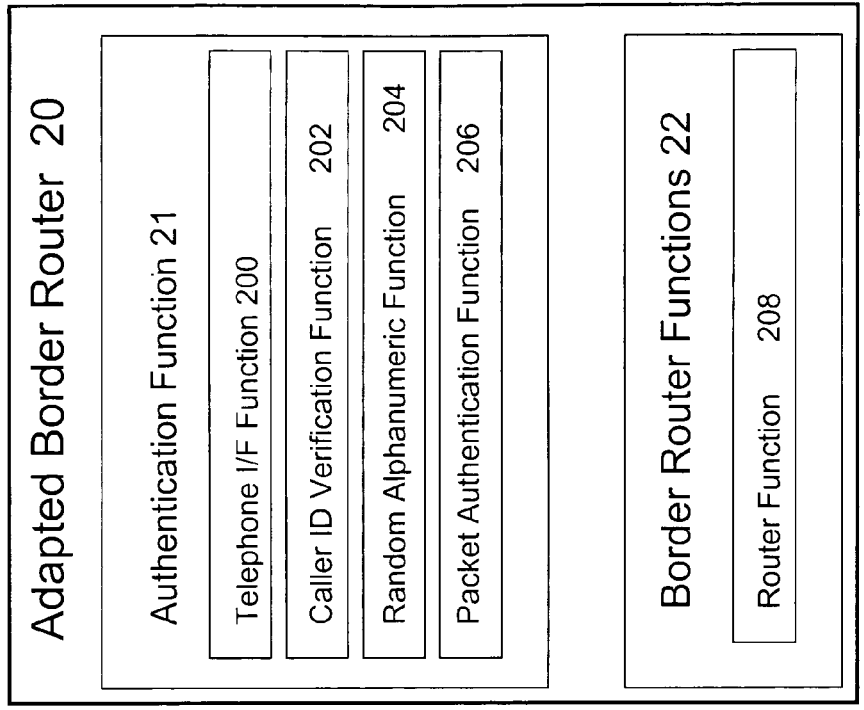
FIG. 2B is a block diagram that illustrates router based authentication functions of the current invention.

With respect to FIG. 2B, the processor 330 is operative with the authentication functions 21 to perform a telephone interface function 200, caller verification function 202, random alphanumeric code generation function 204 and a packet authentication function 206. These are described later in the specification with reference to FIG. 2B.

Databases 360

With reference to FIG. 3, the database 360 in the router 20 stores caller id 12A, PIN 364, random pass key (RPK) alphanumeric 28, session length 366 and connection status 368 as an on/off status.

The alphanumeric 28 are present for only those sessions for which the connection status is on. The alphanumeric 28 are for onetime use only and are deleted from the database at the expiry of the session or when the authorized user terminates the session. Thus requiring a new alphanumeric 28 for every session.

The database 360 may also store classifications of the users (not shown) and the specific application server they are allowed to access, permitting the router 20 to route user to only those application servers for which he/she has been authorized.

Client Security Function 18

With reference to FIG. 2A, the security software function 18 in the client 10 includes a display authentication screen function 212. When the function 18 is invoked it displays the authentication screen 214. The authentication screen 214 displays: (i) a legend 215 that includes a telephone number of the adapted router of the business and instructions to call the telephone number using the cell phone and receive a code 28, (ii) space for the entry of the passkey 216 that is created by entering the telephone number 12A and the alphanumeric code 28, (iii), a connection button 218, which when activated executes the function 220 that encrypts the passkey and embeds in each outgoing packet header to the business network. Further details of the function 220 are described later with reference to FIG. 4.

Authentication Functions 21

With reference to FIG. 2B, the router adapted with an authentication function 21 includes: (i) a telephone interface adapted with an Interactive Voice Response (IVR) System 200 with the ability to receive a telephone call and user interactions and respond with voice, (ii) a function 202 to verify the caller by comparing with pre-stored caller id and a PIN, (iii) a function 204 to generate a random alphanumeric code for voice delivery it to the caller and save in the system, (iv) a packet authentication function 206 that rejects packets from the client 10 that do not have the encrypted passkey embedded in option field of the header of the packet.

The telephone interface function 200 performs the tasks of (i) receiving a telephone call and extracting the caller id from it and user input of tone keys for entry of PIN and voice responding with an alphanumeric code 28.

The caller id verification function 202 performs the tasks of (i) verifying the caller id in the database 360 and (ii) verifying PIN 364 in the database 360.

The random function 204 performs the task of creating an alphanumeric code 28 that is randomly created by the random function 204 using a prior art random number generator and saving in the database 360 anchored by the caller id 12A. The alphanumeric code may be very simple. For example, they may be a four to six digit alphanumeric making them easy to receive and use by the user 14.

The packet authentication function 206 performs the task of separating those packets, which have the option data and those, which do not have option data. Those packets that that do not have the option data in the packet are routed to the open content server 31 by the router functions 22. The packets that have the option data, verifying the presence of optional data in the packet, extracting the passkey from the packet, decrypting the passkey and verifying the caller id and alphanumeric code in the data base 360. Those packets that are verified by the packet authentication function 206 are routed to an authorized business application server 30. The database 360 may also have information that categorizes the authorized users and allows each authorized user to be routed to different application servers depending upon the type of authorization.

The prior art router functions 22 perform the task of routing the packet based on the destination address in the packet header.

A system admin function (not shown) enables the task of administration personnel to enter the authorized user's 14 caller id 12A and PIN 364 to be entered in the database 360 and to delete those caller ids for which the authorization is revoked such as an employee leaving. As well as to enter business rules of how long a session can last with the authorized users by limiting the entry of session length value 366 or deciding a default maximum value.

Internet Standard for IP packet

Figure 4:
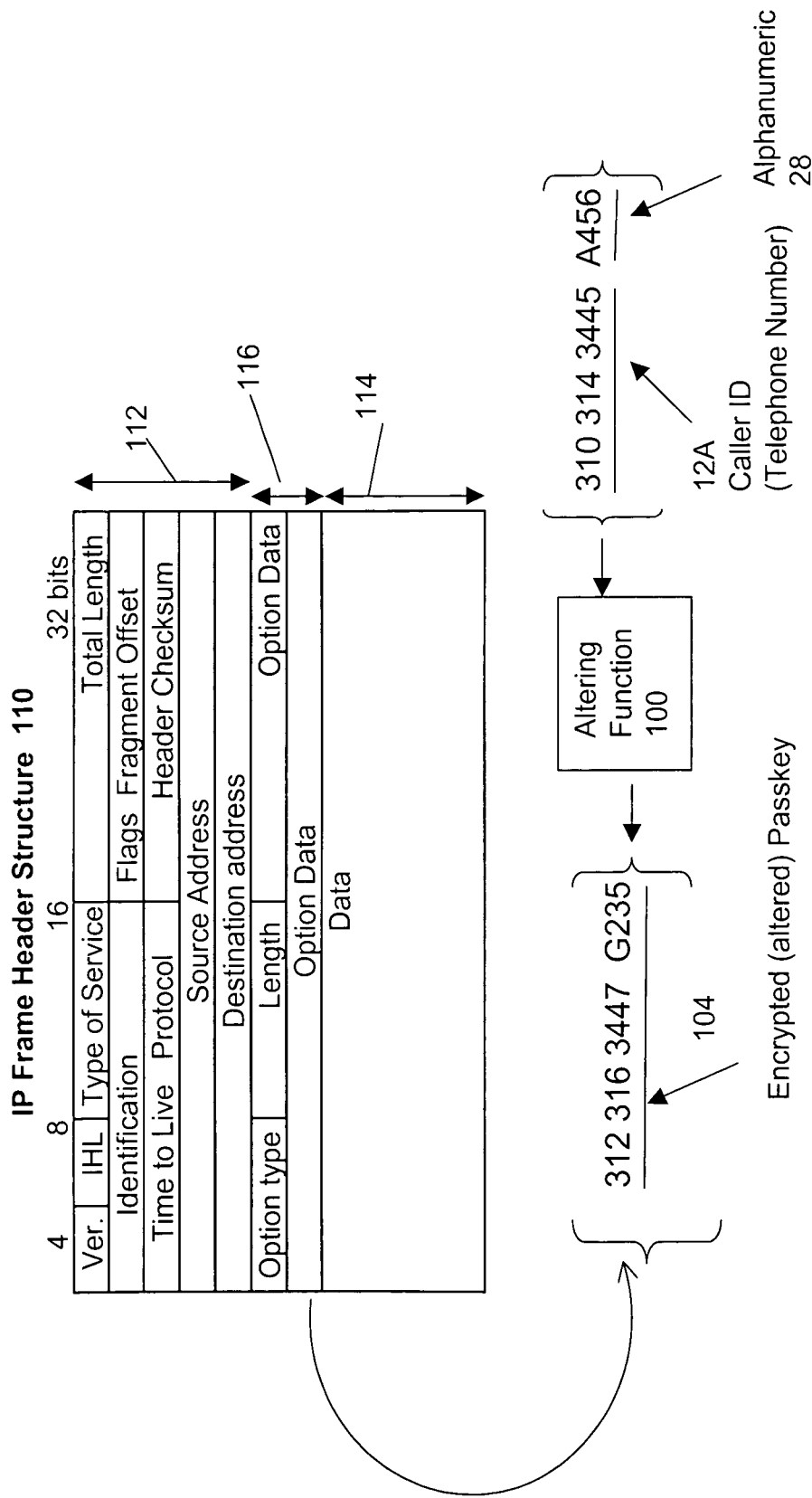
FIG. 4 is a block diagram that illustrates placement of random passkey data in the packet header of the current invention.

With reference to FIG. 4, an Internet Protocol RFC 791 Internet Standard for IP data packets has a header part 112, an option data part 116 and a data part 114. The header part 112 has data fields such as: Ver., IHL, Type of service, Total length, Identification, Flags Fragment Offset, Time to Live protocol, header checksum, source address and destination address. The optional data part 116 has fields such as Option type, Length, and Option data.

This standard allows the optional data fields in the header, which have been used here for a packet level authentication. The embodiment described here uses two 32 bit additional words that are used for a encrypted called id and a alphanumeric passkey as described earlier. The caller id is a ten-digit number, and the if the RPK is 6 digit alphanumeric, these sixteen digits can be accommodated in 64 bits of the two optional data words in the header. Each digit takes 4 bits, hence 64 bits would accommodate 16 digits.

It is believed, that the default or the minimum length of the header 112 is five words. The field, "Total Length" in the header 112, defines the total number of the words in the packet. The router and the applications can figure out where the data 114 begins and where the different fields of the header 112 are. For the optional data, the header has fields of option type, option data length and then the options data itself. Hence, it is believed, using optional data as in this invention does not in any way affect the operation of the routers and application servers. Where these optional data are used, additional programming may be used to make use of them as described in this invention.

Passkey Encryption/Alteration Function 100

With reference to FIG. 4, an encryption/alteration function 100 modifies the passkey into an encrypted passkey 104. The security software function 18 in the client 10 embeds the encrypted passkey 104 in the option data 116 of each packet.

The altering function 100 takes the passkey composed of the caller id 12A and the alphanumeric code 28 and by using an altering and or an encryption algorithm creates the encrypted passkey 104.

The altering algorithm parameters may be derived form the alphanumeric code 28 themselves. There can be many types of alternations such as simple offsets and reverse digits etc. The specific alternation technique and its parameters may be the alphanumeric code itself. Alternatively, a traditional encryption algorithm such as a one-way hash algorithm common in the information security applications may be used.

As an illustration of the altering function 100, the altering (encryption) function takes the alphanumeric and alters it to be another alphanumeric. For example, if the alphanumeric is B347, then it can be altered by adding the $2^{nd}$ digit of 3 to all the digits such that B becomes E, 3 becomes 6, 4 becomes 7 and 7 becomes 0, so that the altered alphanumeric becomes E670. The code that is embedded in the packet is E670. Further more the altering function takes the caller id and alters it to another number by subtracting each digit from 9. For example if the caller id is 310 787 1460, it becomes 689 212 8539. Thus, if the passkey is 310 787 1460 B347, the encrypted or altered passkey may then become 689 212 8539 E670. This approach or encryption scheme makes sure that the encrypted signature in the packet header does not reveal either the caller id or the alphanumeric 28. Any number of such schemes may be used for creating an encrypted passkey.

Furthermore, the encryption or altering of the alphanumeric 28 may be such that it is changing from packet to packet or from a set of packets to a set of packets, provided similar decrypting logic is used in the packet authentication function in the router 20. An example of such variable encryption would be to create a number series using the digits of random passkey alphanumeric 28 as the parameters of the series.

The packet authentication function 206 first decrypts the caller id, and then using the database 360 finds the original alphanumeric code 28 in the database 360 using the caller id as a search reference. Then the function 206 decrypts the alphanumeric code 28 to verify that it matches what is present in the database 360. This verifies that the packet originated from the authorized user 14.

The RBAS Operation

With reference to FIG. 5, the RBAS performs the following steps

At step 500, a user desiring data interface connection to business invokes a security software function in the client, which displays an authentication screen, displaying a telephone number and an entry field for passkey.

At step 502, the User calls the telephone number and enters PIN. Optionally, also enters a numeral that specifies in minutes the length of the session desired. The border router receives call from user, verifies caller id in database, and generates a random alphanumeric code and delivers it user and saves these in the border router database anchored by caller id.

At step 504, user enters in the authentication screen, passkey made up of caller id and just received random alphanumeric code and clicks CONNECT button.

At step 506, the CONNECT button click initiates a session to border router, having pre-stored the link URL, the security software function encrypts and embeds passkey in each data packet header options data fields sent to the border router.

At step 508, the packet authentication function decrypts the passkey in the option data in the header and verifies the option data in the packet against the authentication database fields of caller id and alphanumeric code. Then enables the routing function to rout packet to business data network server 30. The packets that do not have the option field may be routed to the open content server 31.

In summary, the router based authentication system (RBAS) that has an adapted router 20, or an authentication router 280, and the Client Software Security Function 18 enables an authorized user 14 to be continuously authenticated to a business network 30 by embedding each packet with a encrypted passkey that enables the adapted router 20 or the authentication router 280 to protect the business network 30 by rejecting packets from unauthorized users. The RBAS, at the same time allows all other users to access the business open content server 31. The RBAS provides network access security by:

A two-factor authentication of the source of each packet from authorized users.

Enabling routing packets from other users to open content server in the same system simultaneously.

Additional security means of limiting each session in minutes to what the user can pre-specify for each individual session.

Cost reduction in network security by eliminating one or more of the firewall, cards and password infrastructure.

Thus the RBAS technology of this invention enables the RBAS to jointly perform the function of access control, user authentication, firewall, and intrusion detection at the perimeter of the network. By incorporating the RBAS in the routers internal to the network, the RBAS protects different segments of the network from unauthorized uses in other segments of the network.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A system of security in a computer network comprising:
   a. a border router has a system of security that provides a packet level authentication subsystem that does not use IP addresses of the packet, instead uses a token and a passkey in an optional data field of a packet header, the token is randomly generated and is used to encrypt the passkey and the system of security authenticates individual packets received at the border router from remote user clients in a global network;
   b. the system of security routes packets from remote user clients based on the results of the packet level authentication by the authentication subsystem in the border router to different classes of networks.

2. The system of security in a computer network as in claim 1, further comprising:
   the authentication subsystem creates the random code token and uses a telephone network to deliver the random code token to the client;
   the client uses the token to encrypt the passkey and embed in the packets outgoing from the client to the border router, where the router verifies the presence of the passkey, before routing the packet to the different classes of the networks.

3. The system of security in a computer network as in claim 2, further comprising:
   the authentication subsystem uses the telephone network to receive a call, verifies the caller by a combination of a caller id and a personal identification number and creates and delivers the random code token to the client, that enables the client to use the token to encrypt the passkey, in the outgoing packet from the client to the router, and where the router authenticates the passkey and determine the applicable access policy before routing the packet to the different classes of the networks.

4. A system for continuous packet-level authenticated communication from an authorized user on a client to a server on a computer network, wherein a router routing data packets between the client and the server comprising:
   a. the router has a packet-level authentication subsystem that does not use IP addresses of the packet, instead uses a token and a passkey in an optional data field of a packet header;
   b. the packet-level authentication subsystem (i) receives a telephone call from the authorized user, (ii) verifies the user by caller id features of a public telephone infrastructure and a personal identification number and (iii) voice responds with a randomly generated alphanumeric token, the token is used to encrypt the passkey;
   c. the router verifies the packets of communication from the client for the presence of a passkey that is embedded with the alphanumeric in the optional data field of the packet header with the packet-level authentication subsystem.

5. The system as in claim 4, further comprising:
   the router decrypts the passkey in the packet when the client encrypts the passkey before embedding it in the header of the packet.

6. The system as in claim 4, further comprising:
   the users being authenticated by pre-storing their cellular telephone numbers and a user selected PIN in the authentication subsystem.

7. The system as in claim 4, further comprising:
   the router decrypts the passkey in the packet when the client encrypts the passkey with an encryption key derived from the alphanumeric itself before embedding it in the header of the packet.

8. The system as in claim 4, further comprising:
   the router decrypts the passkey in the packet when the client encrypts the passkey with an encryption key derived from the alphanumeric itself before embedding it in the header of the packet and where the encryption key is different for the passkey in each data packet.

9. The system of security in a computer network as in claim 1, further comprising:
   the different classes of networks behind a router, with different access policies, include from a group of, open networks accessible by anyone and restricted networks accessible by employees and customers of a business.

10. The system of security in a computer network as in claim 2, further comprising:
    the client embeds the token in a passkey and encrypts the passkey before embedding the passkey in the header of the packet.

11. The system of security in a computer network as in claim 2, further comprising:
    the client embeds the token in a passkey and encrypts the passkey with an encryption key derived from the random code token itself before embedding the passkey in the header of the packet.

12. The system of security in a computer network as in claim 2, further comprising:
    the client embeds the token in a passkey and encrypts the passkey with an encryption key derived from the random code token itself and where the encryption key is different for the passkey in each data packet before embedding the passkey in the header of the packet.

13. A method for continuous packet-level authenticated communication from an authorized user on a client to a server on a computer network, wherein a router routing data packets between the client and the server, comprising the steps of:
    a. providing a packet-level authentication subsystem in the router that does not use IP addresses in the packet header, instead uses a token and a passkey in an optional data field of packet header, randomly generating the token and using the token to encrypt the passkey for performing an authentication of incoming data packet to the router;
    b. routing in the router the packets to different networks based on the results of authentication of the authorized user on the client.

14. The method as in claim 13, further comprising the steps of:
    a. creating a random code token by the packet-level authentication subsystem and using a telephone network for delivering the random code token to the authorized user;
    b. enabling inputting the token by the user in to the client and using by the client the token for encrypting the passkey and embedding the encrypted passkey by the client in the packets outgoing from the client to the router.

15. The method as in claim 14, further comprising the steps of:
    verifying by the router the packets of communication from the client for the presence of a passkey embedded with the token in the packet header with the help of the authentication subsystem, before routing the packet to the different classes of the networks.

16. The method as in claim 14, further comprising the steps of:
  embedding the token in a passkey and encrypting the passkey before embedding it in the header of the packet.

17. The method as in claim 14, further comprising the steps of:
  embedding the token in a passkey and encrypting the passkey with an encryption key derived from the token itself before embedding it in the header of the packet.

* * * * *